US008600851B1

(12) United States Patent
Pacheco et al.

(10) Patent No.: US 8,600,851 B1
(45) Date of Patent: Dec. 3, 2013

(54) MILITARY BENEFITS IN FINANCIAL PLANNING

(75) Inventors: Robert Anthony Pacheco, San Antonio, TX (US); Baldemar Benavidez, II, San Antonio, TX (US); Scott Hiller, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 992 days.

(21) Appl. No.: 11/321,422

(22) Filed: Dec. 29, 2005

Related U.S. Application Data

(60) Provisional application No. 60/665,338, filed on Mar. 25, 2005.

(51) Int. Cl.
*G06Q 40/00* (2012.01)
(52) U.S. Cl.
USPC .......................................................... 705/35
(58) Field of Classification Search
CPC ..................................................... G06Q 40/06
USPC .................................. 705/36 R, 35
See application file for complete search history.

(56) References Cited

U.S. PATENT DOCUMENTS

| | | | |
|---|---|---|---|
| 6,012,043 A * | 1/2000 | Albright et al. ............. | 705/36 R |
| 6,253,192 B1 | 6/2001 | Corlett et al. | |
| 6,430,542 B1 * | 8/2002 | Moran ........................ | 705/36 R |
| 2002/0055851 A1 * | 5/2002 | Jacobs et al. ...................... | 705/1 |
| 2003/0028466 A1 | 2/2003 | Jenson et al. | |
| 2004/0054565 A1 | 3/2004 | Nemecek et al. | |
| 2005/0081608 A1 * | 4/2005 | Shoelson ........................ | 73/105 |
| 2007/0038487 A1 * | 2/2007 | McCarthy ........................ | 705/4 |

OTHER PUBLICATIONS

McClure, Dave, "New and updated tools for estate and retirement plans", Accounting Today; Jun. 6-Jun. 19, 2005; 19, 10; Accounting & Tax Periodicals, p. 18.*
McClure, Dave, "Financial Planning Segments Accounting Today"; 2005; Accounting & Tax Periodicals, p. 50.*
McClure, Dave, "Financial Planning Rebound?", Accounting Technology; Mar. 2004; 20, 2; ABI/Inform Global, p. 20.*
Levey, Steven I., "Vendors refine retirement/estate planning software", Accounting Today; Jun. 3-Jun. 16, 2002; 16, 10; Accounting & Tax Periodicals, p. 20.*
USAA Retirement Plan Questionnaire.

* cited by examiner

*Primary Examiner* — Eric T Wong
(74) *Attorney, Agent, or Firm* — Kilpatrick Townsend & Stockton LLP

(57) ABSTRACT

Disclosed are systems and methods for preparing a financial plan for a military member eligible to receive military benefits. The systems and methods dynamically and automatically access military parameters stored in one or more data records corresponding to the military member. The military parameters, which are indicative of the one or more military benefits received by the military member, are used to develop a customized financial plan, thereby resulting in increased accuracy and consistency to provide an improved experience for the military member.

28 Claims, 9 Drawing Sheets

FIG. 3c

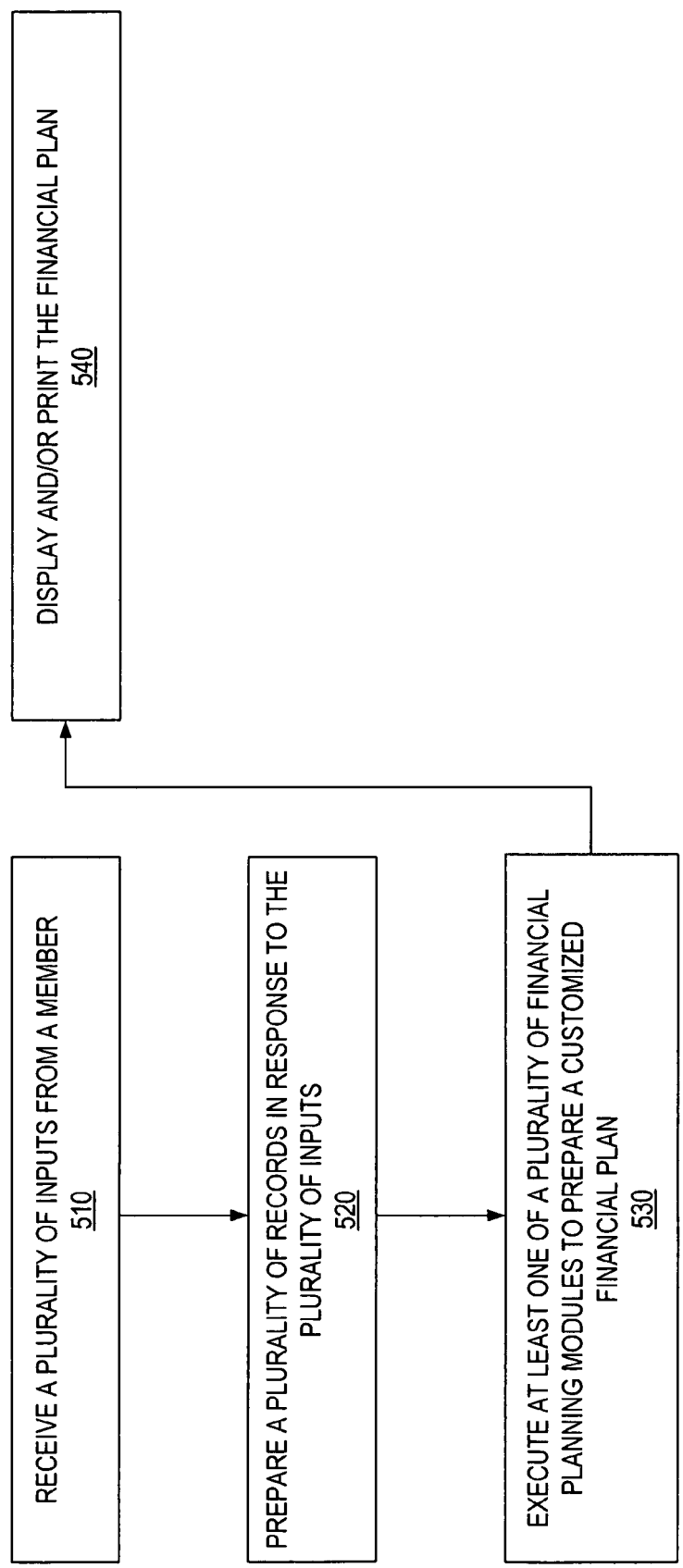

MILITARY BENEFITS IN FINANCIAL PLANNING

CROSS REFERENCE TO RELATED APPLICATIONS

This application claims benefit of priority from U.S. Provisional Application No. 60/665,338 filed Mar. 25, 2005, entitled 'FINANCIAL PLANNING GUIDE', which is hereby incorporated herein in its entirety.

This application is related to 1) U.S. patent application Ser. No. 11/413,551, filed on Apr. 28, 2006, 2) U.S. patent application Ser. No. 11/414,038, filed on Apr. 28, 2006, the disclosures of which are incorporated herein by reference in their entirety.

TECHNICAL FIELD

Various embodiments of the present disclosure pertain to information handling systems used in finance and banking applications and more particularly, to tools and techniques for providing financial planning products and services to clients receiving military benefits.

BACKGROUND

The market demand for financial planning products and services continues to expand. While a few customers may have the knowledge and expertise to plan and manage their own equity portfolios, many customers may elect to retain the services of financial experts such as a certified financial planner (CFP) and/or a personal financial advisor (PFA). Commercially available financial planning tools and services are primarily geared towards mainstream customers that have traditional assets such as IRA and/or 401K investments, company pension plans, social security benefits, life insurance policies and similar others.

Members of the military typically receive numerous financial benefits that are often unique to the military and may not be generally available to the mainstream clients. For example, allowances such as basic allowance for subsistence (BAS) and basic allowance for housing (BAH) and special income such as combat pay are provided to military members. Traditional financial planning tools and services, which are typically geared towards the mainstream clients, are often unable to incorporate benefit parameters that are unique to the military members. As a result, the financial planning needs of the military members are often unmet. In some cases, some financial advisors and planners, who may or may not have the expertise in military benefits, may manually develop a financial plan for military members on a case-by-case basis. Due to the complexities in the military benefits such as tax treatment of combat pay, the manually developed financial plans for the military members may be prone to error, be inaccurate and/or be outdated.

Accordingly, it would be desirable to provide improved financial planning tools and techniques that automatically incorporate military benefits.

SUMMARY

Various embodiments of the present disclosure are directed to systems and methods for preparing a financial plan for a military member eligible to receive military benefits. The systems and methods dynamically and automatically access military parameters stored in one or more data records corresponding to the military member. The military parameters, which are indicative of the one or more military benefits received by the military member, are used to develop a customized financial plan, thereby resulting in increased accuracy and consistency to provide an improved experience for the military member.

BRIEF DESCRIPTION OF THE DRAWINGS

FIG. 1b is a block diagram illustrating an embodiment of a representative information handling system used in the system of FIG. 1a.

Figure 3C:
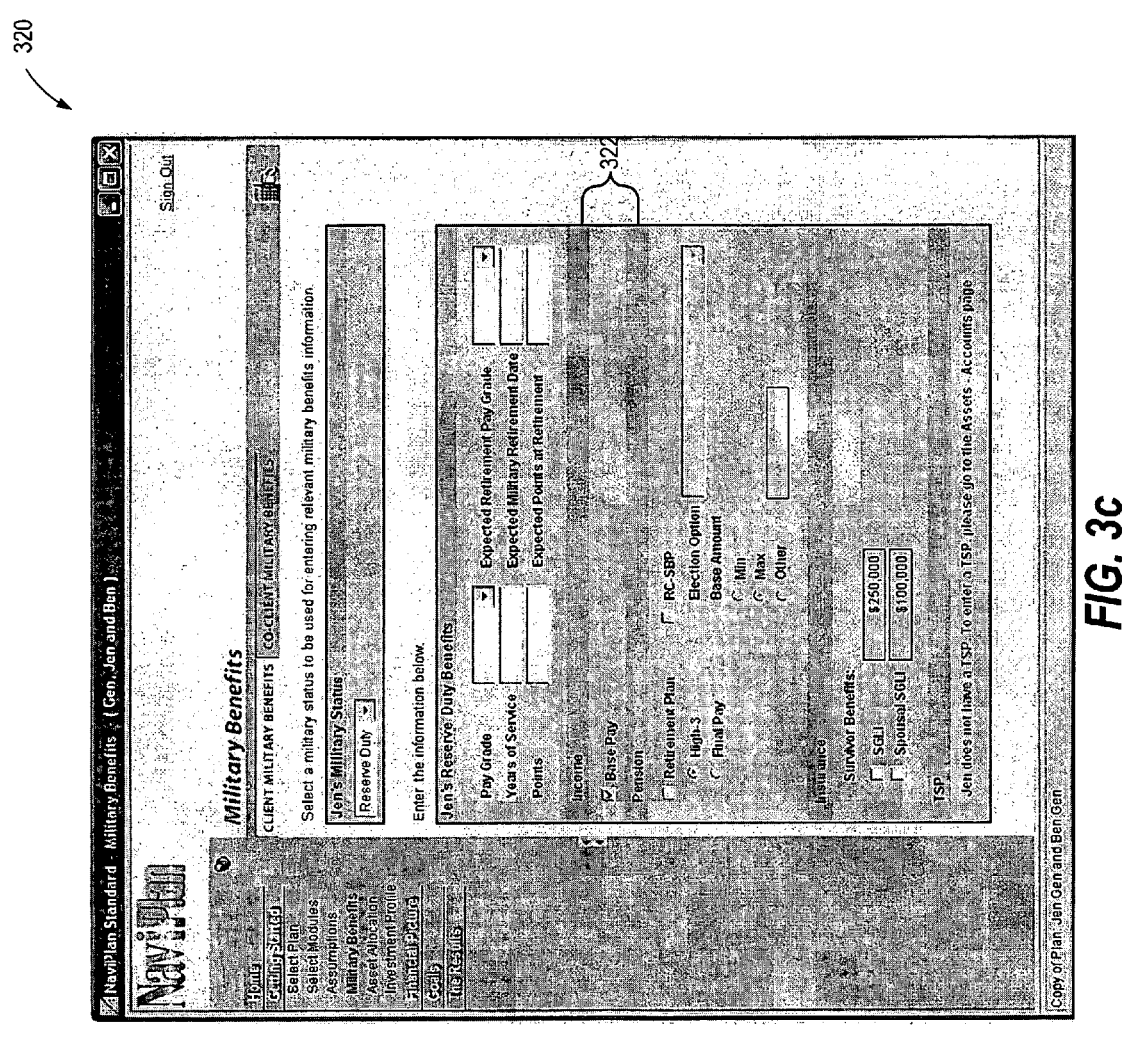

FIGS. 3a, 3b, 3c and 3d illustrate exemplary user interface display screens for configuring military benefits, according to an embodiment.

FIG. 5 is a flow chart illustrating a method for providing a financial plan with military benefits, according to an embodiment.

DETAILED DESCRIPTION

Figure 1A:
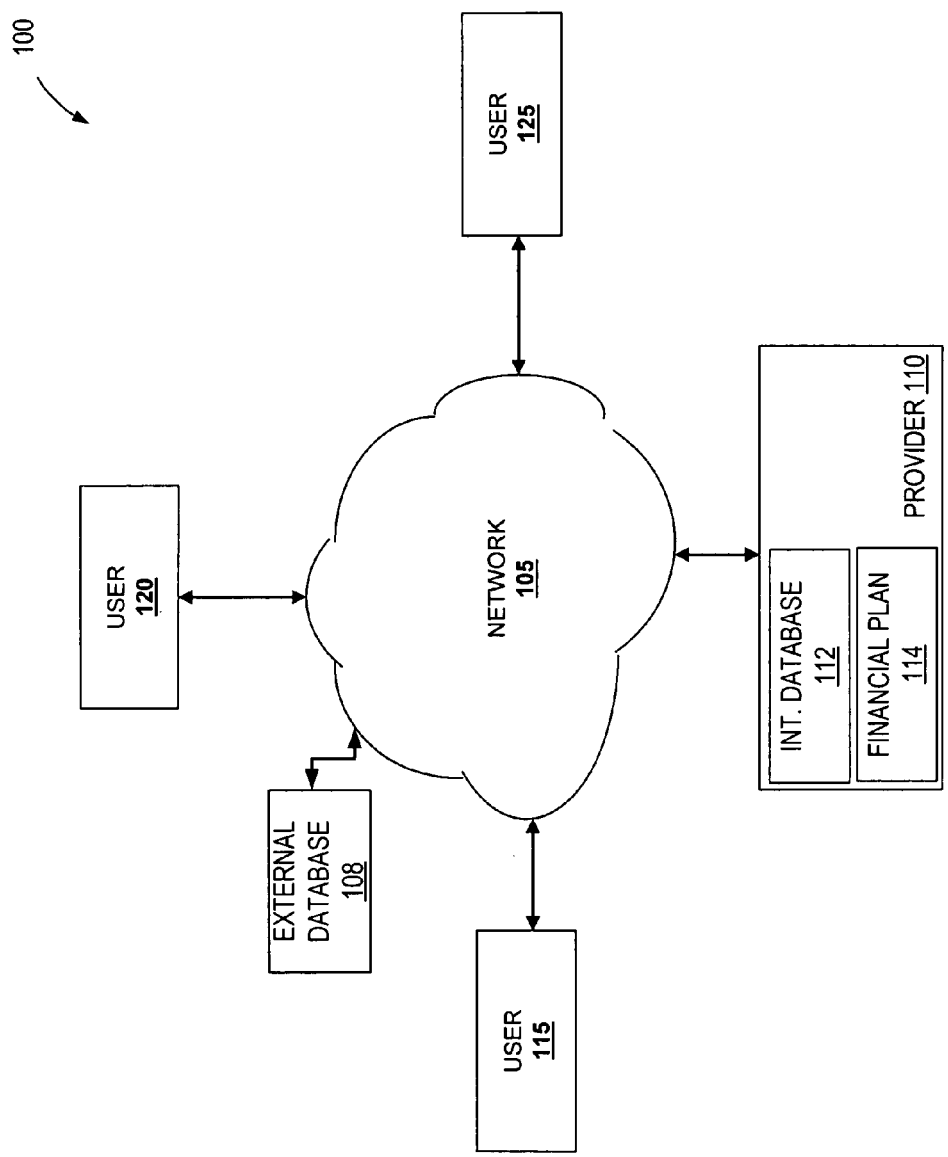
FIG. 1a is a block diagram illustrating an embodiment of a system.

Referring now to FIG. 1a, in one embodiment, a system for financial planning 100 is illustrated. The system 100 includes a computer network 105 such as, for example, a Transport Control Protocol/Internet Protocol (TCP/IP) network (e.g., the Internet and/or an intranet). A financial institution or a provider 110 is operably coupled to the network 105. Examples of a provider 110 may include a bank, an insurance company, a financial investment company, a brokerage firm, a broker/agent, and similar others. A plurality of users 115, 120, and 125 are also operably coupled to the network 105 in order to allow communication between the users 115, 120, and 125 and the provider 110. Examples of a user may include an investor, a member of a financial institution, a financial planning advisor, a broker/agent, a potential buyer of a financial plan, a researcher, and similar others. In a particular embodiment, the user is a military member eligible to receive military benefits.

For clarity, FIG. 1a depicts only one provider 110. However, the system 100 may include a plurality of providers. Likewise, for clarity, FIG. 1a depicts only three users 115, 120, and 125. However, the system 100 may include a plurality of users. In the discussion below, the user 115 is a representative one of the users 115, 120, and 125.

In a particular embodiment, the system 100 is operable to process financial transactions between various entities such as between the provider 110 and the user 115. A financial transaction generally involves a change in the status of the financial resources of two or more entities, such as businesses and/or individuals. In an embodiment, a financial transaction may involve an exchange of financial information between two or more entities. For example, the user 115 may initiate a request to develop a customized financial plan by completing an on-line application at the provider's web site. The completed application form may include personal financial information specific to the user 115. In an embodiment, the user 115 may complete an application in paper form. The paper form may be converted to electronic from by using well known conversion techniques such as image scanning and/or faxing. In an embodiment, the data collected in the paper form may be manually inputted via an on-line application form. Additional detail of a user interface (UI) for collecting information associated with an on-line application form is described with reference to FIGS. 3a, 3b, 3c and 3d.

After receiving personal financial information from the user 115, the provider 115 may create new data records based on the user input and/or access an internal database 112 and/or an external database 108 to look up data records and/or objects containing parameters corresponding to the personal financial information provided by the user 115. In a particular embodiment, the internal database 112 and/or the external database 108 store data records (may also be referred to as records) containing military parameters corresponding to the one or more military benefits received by a military member who may be logged on as the user 115. In an exemplary, non-depicted embodiment, a military pay record may include military parameters corresponding to a base pay, a basic allowance for subsistence (BAS), and a basic allowance for housing (BAH) received by a military member on active duty. The military pay record for the military member may be stored in the internal database 112 and/or the external database 108. In a particular embodiment, the databases 112 and 108 may be implemented as a relational database, as an object oriented database and/or a combination thereof.

A financial plan 114 is prepared by the provider 110 for the benefit of the user 115 by using the personal financial information provided as input. The financial plan 114 may be provided to the user 115 via the network 105 and/or in person. Additional detail of the financial plan 114 is described with reference to FIG. 2.

Each one of the users 115, 120, and 125 and the provider 110 includes a respective network interface for communicating with the network 105 (e.g., outputting information to, and receiving information from, the network 105), such as by transferring information (e.g., instructions, data, signals) between such users and the network 105. Accordingly, through the network 105, the provider 110 communicates with the users 115, 120, and 125, and the users 115, 120, and 125 communicate with the provider 110.

Each one of the users 115, 120, and 125 and the provider 110 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, such IHS's may be coupled to each other. Accordingly, the provider 110 and the users 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g. the network 105).

Figure 1B:
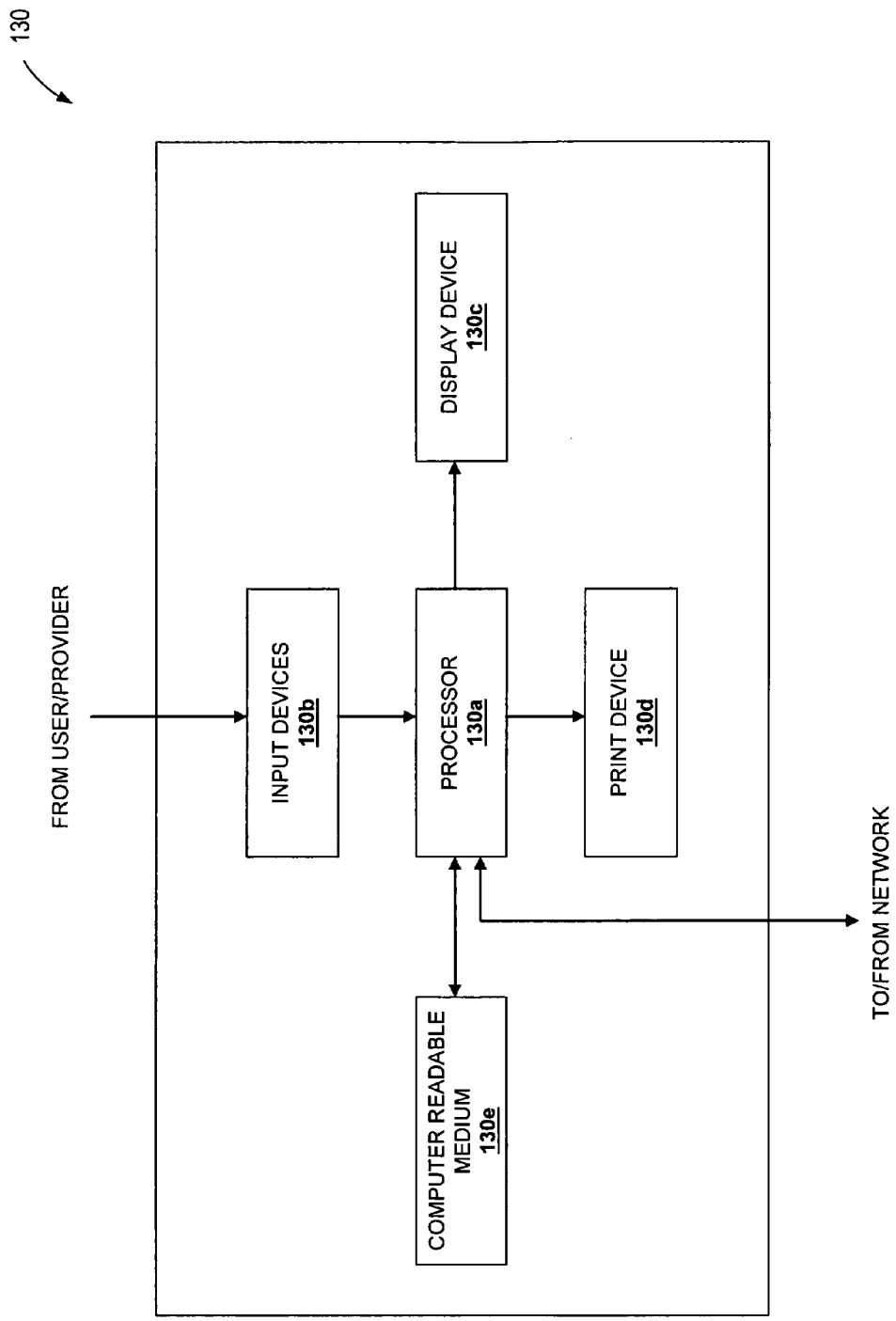

Referring now to FIG. 1b, an IHS 130 which is representative of one of the IHS's described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d prints visual images on paper.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

In an exemplary, non-depicted embodiment, the IHS 130 includes an operating system (OS). The OS is a type of software program that controls execution of other software programs, referred to as application software programs. Each software program includes a plurality of instructions executable by the processor 130a. In various embodiments the instructions and/or software programs may be implemented in various ways, including procedure-based techniques, component-based techniques, and/or object-oriented techniques, among others. Examples include assembler, C, XML, C++ objects, Java and Microsoft's NET technology.

The computer readable medium 130e and the processor 130a are structurally and functionally interrelated with one another as described below in further detail. Each IHS of the illustrative embodiment is structurally and functionally interrelated with a respective computer readable medium, similar to the manner in which the processor 130a is structurally and functionally interrelated with the comptuer readable medium 130e. In that regard, the computer readable medium 130e is a representative one of such computer readable media including, for example, but not limited to, a hard disk drive.

The computer readable medium 130e stores (e.g., encodes, records, or embodies) functional descriptive material (e.g., including but not limited to software (also referred to as computer programs or applications) or data structures). Such functional descriptive material imparts functionality when encoded on the computer readable medium 130e. Also, such functional descriptive material is structurally and functionally interrelated to the computer readable medium 130e.

With such functional descriptive material, data structures define structural and functional interrelationships between such data structures and the computer readable medium 130e (and other aspects of the system 100). Such interrelationships permit the data structures' functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130a reads (e.g., accesses or copies) such functional descriptive material from the computer readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer readable medium) for causing the processor 130a to perform additional operations (as described elsewhere herein). Accordingly, such functional descriptive material exhibits a functional interrelationship with the way in which processor 130a executes its processes and performs its operations.

Further, the computer readable medium 130e is an apparatus from which the computer application is accessible by the processor 130a, and the computer application is processable by the processor 130a for causing the processor 130a to perform such additional operations. In addition to reading such functional descriptive material from the computer readable medium 130e, the processor 130a is capable of reading such functional descriptive material from (or through) the network 105 which is also a computer readable medium (or apparatus). Moreover, the memory device of the IHS 130 is itself a computer readable medium (or apparatus).

Figure 2:
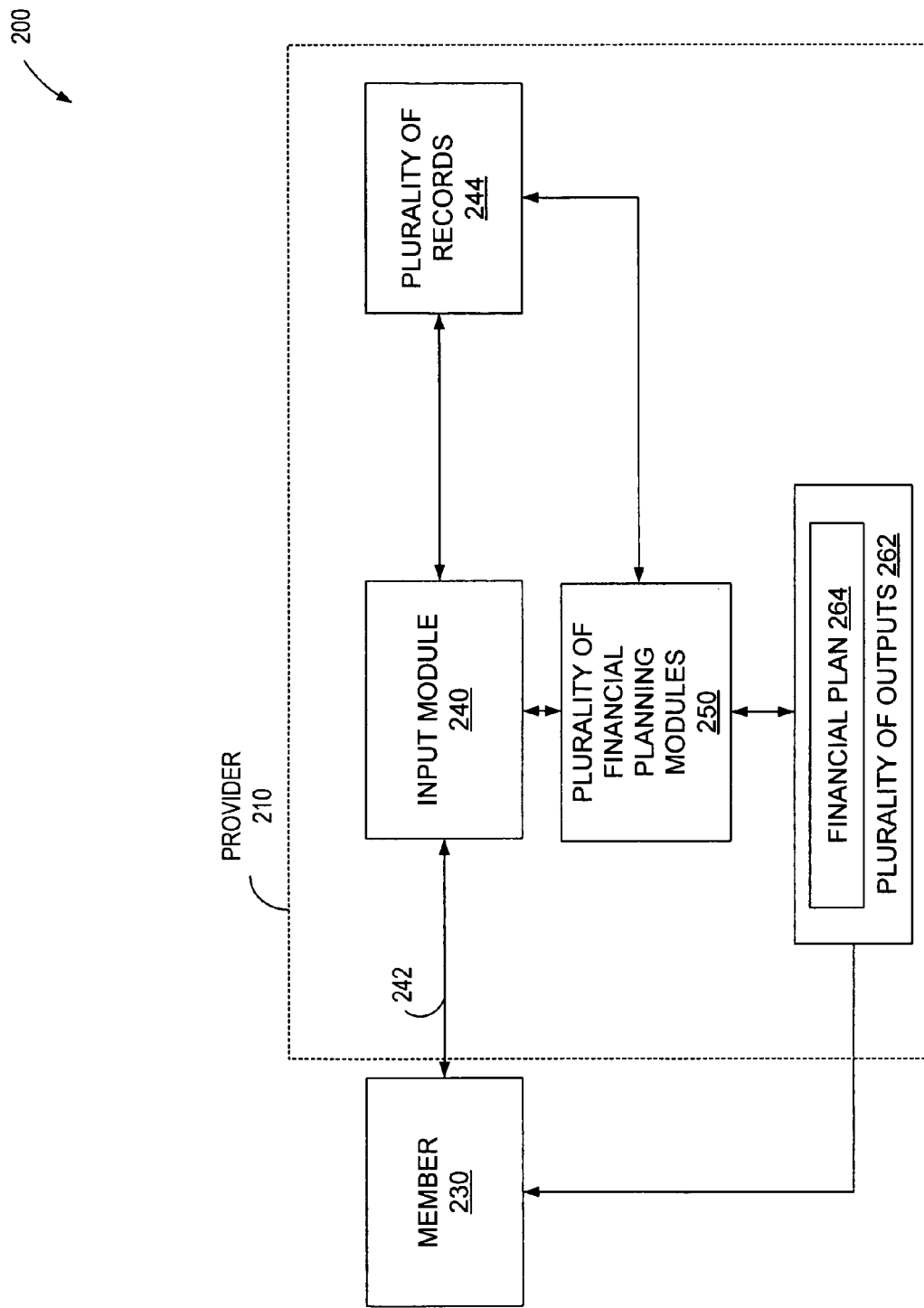
FIG. 2 is a block diagram illustrating a system for preparing a financial plan with military benefits, according to an embodiment.
Figure 3A:
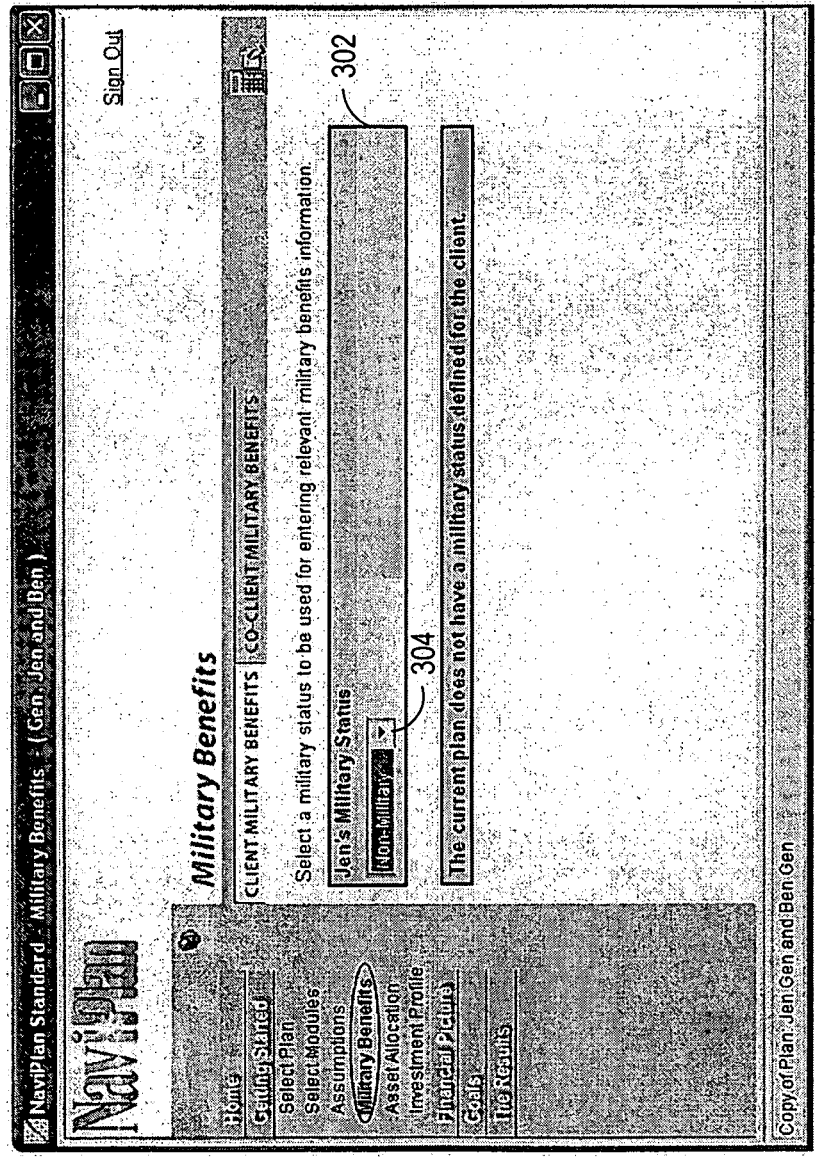
Figure 3B:
Figure 3D:
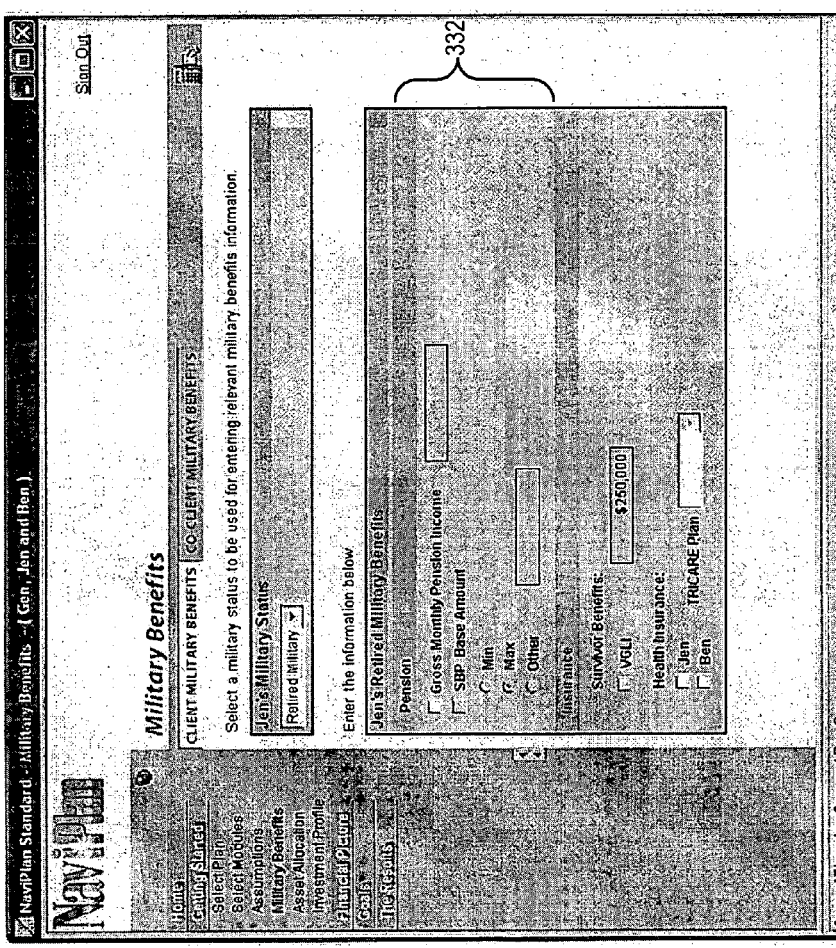

FIG. 2 is a block diagram illustrating a system 200 for preparing a financial plan with military benefits, according to an embodiment. In the depicted embodiment, the system 200 includes a provider 210, such as a financial institution and/or one of its agents, communicating with a member 230 to provide customized financial planning products and services, which include military benefits. In a particular embodiment, the provider 210 is substantially the same as the provider 110 and the member 230 is substantially the same as the user 115 described with reference to FIG. 1a and 1b.

In the depicted embodiment, the system 200 includes an input module 240 operable to receive a plurality of inputs 242 and generate a plurality of records 244. In an exemplary, non-depicted embodiment, the plurality of records 244 may be created independent of the plurality of inputs, e.g., by importing data from external sources. The system 200 also includes a plurality of financial planning modules 250, which are coupled to the input module 240 to receive the plurality of inputs 242 and coupled to the plurality of records 244. The plurality of financial planning modules 250 provide a plurality of outputs 262 including a customized financial plan 264 with military benefits.

In a particular embodiment, the input module 240 is a front end interface program such as a web based user interface (UI) program and/or a paper questionnaire to interact with a financial planner/advisor and/or the member 230 and collect the plurality of inputs 242. In another embodiment, the input module 240 is a military benefits module for interacting with the member 230 and generating a plurality of military records included in the plurality of records 244.

In a particular embodiment, the financial plan 264 is substantially the same as the financial plan 114 described with reference to FIG. 1a. As described herein, the financial plan 264 is a document that describes how a member may achieve one or more financial goals through management of financial resources. Specifically, the financial plan 264 suggests a series of steps the member 230 may undertake in the future to meet the stated goals by using the member's financial resources, including past, present and future financial assets. In a particular embodiment, the member 230 is also a military member and is eligible to receive military benefits. The military benefits represent at least one of the past, present and future financial assets of the member 230 and are therefore automatically and accurately included in the preparation of the financial plan 264.

In an exemplary, non-depicted embodiment, the system 200 may include a plurality of providers and clients/users/members. In a particular embodiment, the provider 210 is coupled to the member 230 via the network 105. At least a portion of the financial transactions between the provider 210 and the member 230 such as preparation of the financial plan 264 in response to submittal of an application by the member 230 take place electronically via the network 105.

In a particular embodiment, the plurality of inputs 242 are used by the input module 240 to define, create and/or populate the plurality of records 244. In an embodiment, at least one of the plurality of records 244 is automatically generated in response to receiving the plurality of inputs 242 and at least one of the plurality of records 244 contains military parameters that are indicative of military benefits. The plurality of records 244 may be stored in look up tables and/or software objects in the internal database 112 and/or the external database 108. The look up tables and/or software objects may be configured to be automatically updated or refreshed to include current, accurate data. A military parameter, attribute or a property may be described as a quantifiable characteristic or feature of a military benefit. In a particular embodiment, a military pay record of a military member on active duty may include military pay parameters such as a base pay, a basic allowance for subsistence (BAS), and a basic allowance for housing (BAH). Additional details of exemplary military records are described with reference to FIG. 4.

In a particular embodiment, the plurality of records 244 corresponding to the member 230 may be accessed by providing a particular key such as a social security number and/or member identification (ID) number that is unique to the member 230. In an exemplary, non-depicted embodiment, the input module 240 may create a personal identification record of the member 230 when the member initially applies for a membership of the provider 210. The personal identification record may be created based on member responses to a questionnaire and/or an application form. In an exemplary, non-depicted embodiment, the plurality of inputs 242 and/or the plurality of records 244 may be received from various sources in addition to the member 230 such as the internal database 112 and/or the external database 108, and other Internet sources. Additional details of user interface display screens used to collect the plurality of inputs 242 are described with reference to FIGS. 3a, 3b, 3c and 3d.

The personal identification record may include information such as full legal name, address, phone number, social security number, military duty status, and similar others. In a particular embodiment, additional military records indicating the military benefits may be automatically generated by the input module 240 and stored in the plurality of records 244 based on the personal identification information provided. For example, military income may be automatically and accurately derived based on current rank and years in service input. Similarly, expected military retirement pay may be automatically and accurately derived based on planned military retirement age and retirement pay grade (rank) inputs.

In the depicted embodiment, the plurality of financial planning modules 250 are executable to generate the plurality of outputs 262 in response to receiving the plurality of inputs 242 from the input module 240 and accessing the plurality of records 244. In a particular embodiment, the plurality of outputs 262 is customized for the member 230. The financial plan 264 may include one or more sub-plans to achieve specific financial objectives such as a plan for retirement, a plan for a college education, a life insurance plan and similar others that may be of interest to and/or relevant to the member 230. Each one of the plurality of financial planning modules 250 is executable to generate a sub-plan. That is, each one of the plurality of financial planning mothiles 250 is executable to provide an output included in the plurality of outputs 262. The plurality of outputs 262 may be provided in various forms such as a printed output, a display output and an electronic file output.

To generate the sub-plans, the plurality of financial planning modules 250 may include a personal goal planning module, a retirement planning module (with CSB/Redux, High-3, Final Pay), an estate planning module, an asset allocation module, a liability reduction module, a life insurance module, a health insurance module, a disability insurance module, a thrift savings plan (TSP) module, a property and casualty insurance module and similar others. Additional examples of financial planning modules may include a death gratuity module, a spousal dependents indemnity compensation (DIC) module, a children dependents indemnity compensation (DIC) module, a disability benefits module, a TRICARE health insurance module, and a survivor benefit plan (SBP) module. Selection of the particular modules from the plurality of financial planning modules 250 may depend on the specific financial objectives relevant to the member 230. Each one of the plurality of financial planning modules 250 may access military records containing military parameters corresponding to the member 230.

FIGS. 3a, 3b, 3c and 3d illustrate exemplary user interface display screens for configuring military benefits, according to an embodiment. As described earlier, the input module 240 interfaces with the financial planners/advisors via a series of display screens 300, 310, 320 and 330 to receive at least one of the plurality of inputs 240. As described earlier, the financial planners/advisors may work in conjunction with the members 230 to interact with the display screens 300, 310, 320 and 330. In order to determine the eligibility of the member 230 to receive military benefits, a particular value for a military status 302 parameter is selected by the member 230. In a particular embodiment, the selectable values for the military status 302 parameter may include non-military, active duty, reserve duty, retired military and other military (selectable from a pull-down menu 304). Depending on the members' selection of the military status 302 parameter, the input module 240 displays one of the display screens 310, 320 or 330. For example, if the member 230 selects active duty, then military benefits and parameters relevant to the active duty selection are automatically displayed on the display screen 310 for user input. An income record 306 corresponding to the military member having the active duty status include selections for a base pay, a basic allowance for subsistence (BAS), and a basic allowance for housing (BAH). Similarly, if the member 230 selects reserve duty, then military benefits and parameters relevant to the reserve duty selection are automatically displayed on the display screen 320 for user input. An income record 322 for the reserve duty selection includes a base pay selection. Display screen 330 is displayed in response to selecting retired military. A pension record 332 corresponding to the military member having the retired military status include a gross monthly pension income selection. The input module 240 collects inputs from the member 230 and generates the plurality of records 244.

Figure 4:
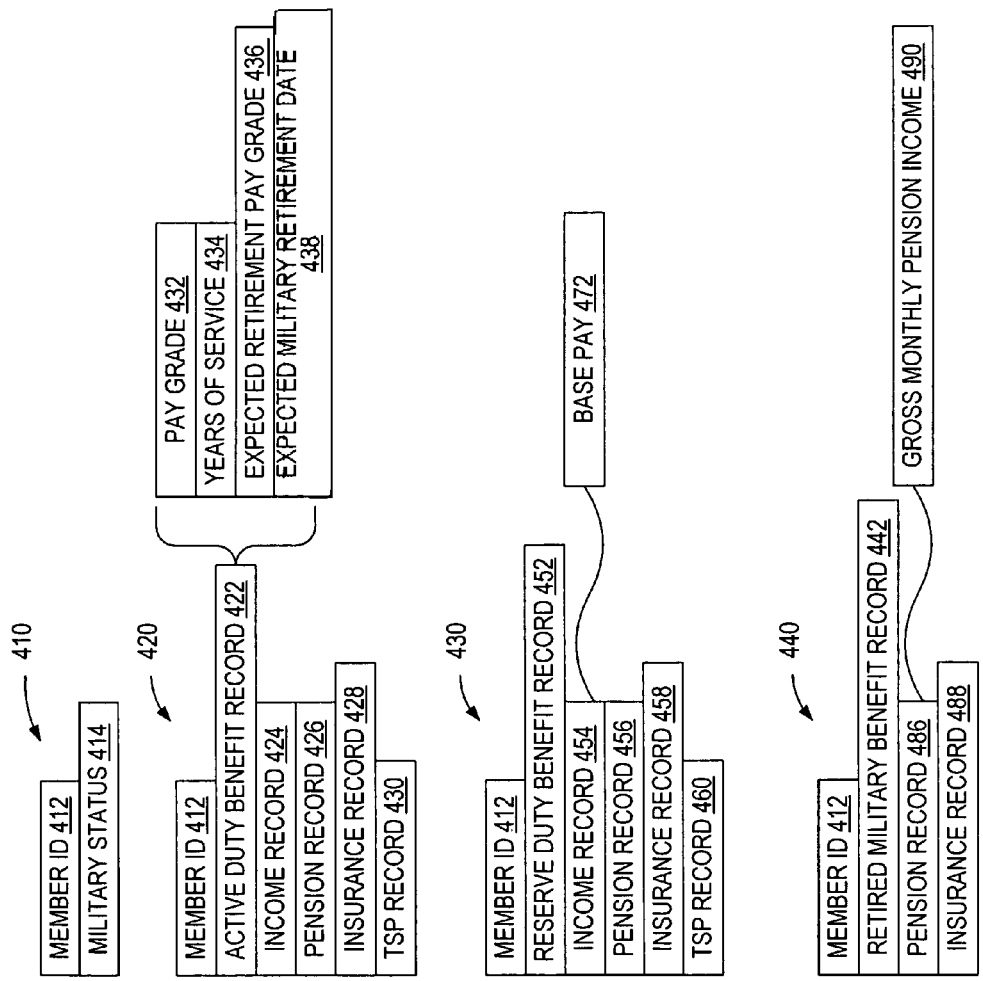
FIG. 4 illustrates exemplary military records corresponding to some of the military benefits configured with reference to FIGS. 3a, 3b, 3c and 3d, according to an embodiment.

FIG. 4 illustrates exemplary military records corresponding to some of the military benefits configured with reference to FIGS. 3a, 3b, 3c and 3d, according to an embodiment. As described earlier, at least one of the plurality of records 244 includes a military record. In the depicted embodiment, the plurality of records 244 include a military status record 410, an active duty military record 420, a reserve duty military record 430 and a retired military record 440. Although not shown, the plurality of records 244 may include several other types of military as well as non-military records. For example, an expense record may be provided for insurance premiums. The expense record may be created for all military statuses including active duty, reserve duty and retired military.

The military status record 410 includes a member identifier parameter 412 (which may be used as a key) and a corresponding military status parameter 414. The military status record 410 may include a plurality of entries, e.g., one for each member. As described earlier, the permissible values for the military status parameter 414 is selectable to be one of non-military, active duty, reserve duty, retired military and other military.

In a particular embodiment, an active duty military record 420 includes a member identifier parameter 412 (which may be used as a key), an active duty benefit record 422, an income record 424, a pension record 426, an insurance record 428 and a thrift savings plan (TSP) record 430. Each one of the records 422, 424, 426, 428 and 430 includes one or more military parameters. In the depicted embodiment, the active duty benefit record 422 includes a pay grade 432 (as a user selectable value), years of service 434, expected retirement pay grade 436 (as a user selectable value) and expected military retirement date 438.

In a particular embodiment, a reserve duty military record 430 includes a member identifier parameter 412 (which may be used as a key), a reserve duty benefit record 452, an income record 454, a pension record 456, an insurance record 458 and a thrift savings plan record 460. Each one of the records 452, 454, 456, 458 and 460 includes one or more military parameters. The number of military parameters included in the income record 454 (which is substantially the same as the income record 322 described with reference to FIG. 3c) for reserve duty may vary from the income record 424 (which is substantially the same as the income record 306 described with reference to FIG. 3b) for active duty. For example, the income record 422 for reserve duty may only include a base pay 472 compared to a base pay, a BAH pay and a BAS pay for the income record 424 for active duty.

In a particular embodiment, a retired military record 440 includes a member identifier parameter 412 (which may be used as a key), a retired military benefits record 442, a pension record 486, and an insurance record 488. Each one of the records 442, 486 and 488 includes one or more military parameters. The number of military parameters included in the pension record 486 for retired military may vary from the pension record 424 for active duty. For example, the pension record 426 for active duty may include a retirement plan selection parameter, whereas the pension record 486 (which is substantially the same as the pension record 332 described with reference to FIG. 3d) for retired military may include a gross monthly pension income 490.

FIG. 5 is a flow chart illustrating a method for providing a financial plan with military benefits, according to an embodiment. In a particular embodiment, the financial plan is substantially the same as the financial plan 264 described with reference to FIG. 2. In an embodiment, the method for providing the financial plan is implemented using the system 100 and the computer readable medium 130e described with reference to FIGS. 1a and 1b. In another embodiment, the method for providing the financial plan is implemented using the system 200 described with reference to FIG. 2.

In step 510, a plurality of inputs are received from a member. In step 520, a plurality of data records, e.g., the plurality of records 244, are prepared in response to the plurality of inputs. The plurality of data records are accessible by using a key such as a personal identification record corresponding to a military member eligible to receive military benefits. The plurality of data records also include military parameters indicative of the military benefits. In step 530, at least one of a plurality of financial planning modules is executed to generate the financial plan. Military parameters stored in the plurality of the data records corresponding to the personal identification record are accessed to prepare a customized financial plan for the member.

Various steps described above may be added, omitted, combined, altered, or performed in different orders. For example, in a particular embodiment, step 540 may be added to display and/or print the financial plan. In step 540, the financial plan is output, e.g., displayed and/or printed, for the benefit of the member.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware, software and methods illustrated herein may vary depending on the implementation. For example, it should be understood that while the various embodiments describe development of a financial plan with military benefits, it would be within the spirit and scope of the invention to encompass an embodiment with other forms of non-military benefits, e.g., civilian employees participating in the Federal civil service retirement system (CSRS).

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A financial planning apparatus comprising:
   a processor; and
   a memory coupled to the processor and storing instructions executable by the processor to:
      receive input via an input module of an information handling system (IHS) coupled to a network comprising a selection of a military status parameter for a military member from among a group that includes active duty, reserve duty, retired military, and other military;
      determine that the military member is eligible to receive military benefits based on the selection of the military status parameter;
      provide, in response to receiving the input, a plurality of income record options that comprise a plurality of military pay parameters for which the military member is eligible;
      wherein providing the income record options includes dynamically modifying at least one pay parameter depending upon which military status parameter was selected and providing at least one pay parameter unmodified regardless of which military status parameter was selected;
      obtain selection of an income record from the income record options;
      generate via a financial planning module a military record in response to receiving the selected income record;
      generate, using the military record, a financial plan for the military member, the financial plan comprising a plurality of financial sub-plans with associated financial objectives for the military member; and
      provide the generated financial plan for the military member.

2. The apparatus of claim 1, wherein the military record comprises a personal identification record provided as an input through the IHS.

3. The apparatus of claim 2, wherein the financial planning module is operable to access the income record corresponding to the personal identification record.

4. The apparatus of claim 1, wherein the income record is stored in a lookup table.

5. The apparatus of claim 2, wherein the personal identification record comprises a name, an address, a phone number, and a social security number of the military member, and the military status parameter received by the input module.

6. The apparatus of claim 1, wherein the income record options comprise a base pay, a basic allowance for subsistence (BAS), and a basic allowance for housing (BAH).

7. The apparatus of claim 1, wherein the financial planning module includes at least one of a personal goal planning module, a retirement planning module, an estate planning module, an asset allocation module, a liability reduction module, a life insurance module, a health insurance module, a disability insurance module, a thrift savings plan module, and a property and casualty insurance module.

8. A method for providing a financial plan, the method comprising:
   receiving an input, through a network by an input module coupled to an information handling system (IHS), that comprises a selection of a military status parameter for a military member from among a group that includes active duty, reserve duty, retired military, and other military;
   determining that the military member is eligible to receive military benefits based on the selection of the military status parameter;
   providing, in response to the receiving of the input, a plurality of income record options saved in a memory that comprise a plurality of military pay parameters for which the military member is eligible;
   wherein providing the income record options includes dynamically modifying at least one pay parameter depending upon which military status parameter was selected and providing at least one pay parameter unmodified regardless of which military status parameter was selected;

receiving, by the IHS through the network, a selection of an income record from the income record options, wherein the military record is accessible by a personal identification record saved in the memory and corresponding to the military member;

generating a military record in response to receiving the selected income record; and generating via a financial planning module a financial plan for the military member using the military record, wherein the financial plan comprises a plurality of financial subplans with associated financial objectives for the military member; and providing the generated financial plan for the military member.

9. The method of claim 8, wherein the military record corresponding to the personal identification record is accessed by the IHS accessing a lookup table, wherein the lookup table stores at least a portion of the personal identification record corresponding to each military member.

10. The method of claim 8, wherein the personal identification record comprises a name, an address, a phone number, and a social security number of the military member, and the military status parameter received by the input module.

11. The method of claim 10, wherein the active duty income record options comprise a base pay, a basic allowance for subsistence (BAS), and a basic allowance for housing (BAH) for the military member.

12. The method of claim 11, wherein the financial planning module is a retirement planning module, wherein the retirement planning module accesses the income record to provide a retirement plan included in the financial plan.

13. The method of claim 8, wherein the planning module includes a personal goal planning module, a retirement planning module, an estate planning module, an asset allocation module, a liability reduction module, a life insurance module, a health insurance module, a disability insurance module, a thrift savings plan module, and a property and casualty insurance module.

14. The method of claim 8, wherein the military record is automatically generated by the IHS in response to the input module receiving the input.

15. A non-transitory computer-readable medium storing computer-executable instructions for providing a financial plan, said instructions, when executed by a computer, causing the computer to:

receive an input from an information handling system (IHS) coupled to a network that comprises a selection of a military status parameter for a military member from among a group that includes active duty, reserve duty, retired military, and other military;

determine that the military member is eligible to receive military benefits based on the selection of the military status parameter;

provide, in response to receiving the selection of the military status parameter, a plurality of income record options that comprise a plurality of military pay parameters for which the military member is eligible;

wherein providing the income record options includes dynamically modifying at least one pay parameter depending upon which military status parameter was selected and providing at least one pay parameter unmodified regardless of which military status parameter was selected;

receive a selection of an income record from the income record options, wherein the military record is accessible by a personal identification record saved in a memory and corresponding to the military member;

generate a military record in response to receiving the selected income record;

generate via a financial planning module a financial plan for the military member using the military record, wherein the financial plan comprises a plurality of financial sub-plans with associated financial objectives for the military member; and provide the generated financial plan for the military member.

16. The non-transitory computer-readable medium of claim 15, wherein the military record corresponding to the personal identification record is accessed according to computer-readable instructions located on the computer readable medium that, when executed by the computer, cause the computer to access a lookup table, wherein the lookup table stores at least a portion of the personal identification record corresponding to each military member.

17. The non-transitory computer-readable medium of claim 15, wherein the personal identification record comprises a name, an address, a phone number, and a social security number of the military member, and the military status parameter received by the input module.

18. The non-transitory computer-readable medium of claim 17, wherein the income record options comprise a base pay, a basic allowance for subsistence (BAS), and a basic allowance for housing (BAH) for the military member.

19. The non-transitory computer-readable medium of claim 18, wherein the financial planning module is a retirement planning module, and wherein the retirement planning module comprises computer-readable instructions located on the computer-readable medium that, when executed by the computer, cause the computer to access the income record to provide a retirement plan included in the financial plan.

20. The non-transitory computer-readable medium of claim 15, wherein the financial planning module includes a personal goal planning module, a retirement planning module, an estate planning module, an asset allocation module, a liability reduction module, a life insurance module, a health insurance module, a disability insurance module, a thrift savings plan module, and a property and casualty insurance module.

21. The non-transitory computer-readable medium of claim 15, further comprising computer-readable instructions located on the computer-readable medium that, when executed by the computer, cause the computer to automatically generate the military record in response to receiving the input of the military status parameter.

22. An information handling system (IHS) for preparing a financial plan, the IHS comprising:

a processor in a computing device;

a memory coupled to the processor and storing instructions that, when executed by the processor, cause the processor to:

receive an input, to an input module of the IHS through a network, that comprises a selection of a military status parameter for a military member from among a group that includes active duty, reserve duty, retired military, and other military;

determine that the military member is eligible to receive military benefits based on the selection of the military status parameter;

provide, in response to receiving the input, a plurality of income record options that comprise a plurality of military pay parameters for which the military member is eligible;

wherein providing the income record options includes dynamically modifying at least one pay parameter depending upon which military status parameter was selected and providing at least one pay parameter unmodified regardless of which military status parameter was selected;

receive a selection of an input record from the income record options, wherein the military record is accessible by a personal identification record saved in the memory and corresponding to the military member;

generate a military record in response to receiving the selected income record; and generate via a financial planning module a financial plan for the military member using the military record, wherein the financial plan comprises a plurality of financial sub-plans with associated financial objectives for the military member; and provide the generated financial plan for the military member.

23. The system of claim 22, wherein the military record corresponding to the personal identification record is accessed by accessing a lookup table, wherein the lookup table stores at least a portion of the personal identification record corresponding to each military member.

24. The system of claim 22, wherein the personal identification record comprises a name, an address, a phone number, and a social security number of the military member, and the military status input received by the input module.

25. The system of claim 24, wherein the income record options comprise a base pay, a basic allowance for subsistence (BAS), and a basic allowance for housing (BAH) for the military member.

26. The system of claim 25, wherein the financial planning module is a retirement planning module, wherein the retirement planning module accesses the income record to provide a retirement plan included in the financial plan.

27. The system of claim 22, wherein the financial planning module includes a personal goal planning module, a retirement planning module, an estate planning module, an asset allocation module, a liability reduction module, a life insurance module, a health insurance module, a disability insurance module, a thrift savings plan module, and a property and casualty insurance module.

28. The system of claim 22, wherein the military record is automatically generated using the processor in response to the input module receiving the input of the military status parameter.

* * * * *